(12) United States Patent
Jabusch et al.

(10) Patent No.: US 11,577,687 B2
(45) Date of Patent: *Feb. 14, 2023

(54) MODULAR SEATBELT RETRACTOR (71) Applicant: AUTOLIV DEVELOPMENT AB, Vargarda (SE)

(72) Inventors: Ronald Jabusch, Elmshorn (DE); Günter Clute, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 28 days.

This patent is subject to a terminal disclaimer.

(21) Appl. No.: 17/357,169

(22) Filed: Jun. 24, 2021

(65) Prior Publication Data
US 2021/0387593 A1 Dec. 16, 2021

Related U.S. Application Data (63) Continuation of application No. 16/173,166, filed on Oct. 29, 2018, now abandoned.

(30) Foreign Application Priority Data

Aug. 8, 2018 (DE) ..................... 10 2018 213 282.8

(51) Int. Cl.
*B60R 22/44* (2006.01)
*B60R 22/46* (2006.01)
*B60R 22/34* (2006.01)

(52) U.S. Cl.
CPC .. B60R 22/4628 (2013.01); *B60R 2022/3402* (2013.01); *B60R 2022/4666* (2013.01)

(58) Field of Classification Search
CPC ......... B60R 22/24; B60R 22/34; B60R 22/44; B60R 22/46; B60R 22/3413; B60R 22/4628; B60R 2022/3402
See application file for complete search history.

(56) References Cited

U.S. PATENT DOCUMENTS

| | | |
|---|---|---|
| 4,568,106 A | 2/1986 | Yokoyama |
| 4,588,144 A | 5/1986 | Nishimura |
| 4,592,520 A | 6/1986 | Kawaguchi |
| 4,749,231 A | 6/1988 | Cremer et al. |
| 5,253,924 A | 10/1993 | Glance |
| 5,697,670 A | 12/1997 | Husted et al. |
| 6,371,397 B1 | 4/2002 | Specht |
| 6,637,772 B1 | 10/2003 | Fagerhag et al. |
| 6,676,060 B2 | 1/2004 | Tanaka et al. |
| 6,726,249 B2 | 4/2004 | Yano et al. |
| 6,737,819 B2 | 5/2004 | Tanji |
| 6,908,112 B2 | 6/2005 | Yano et al. |
| 6,918,558 B2 | 7/2005 | Tanaka et al. |

(Continued)

FOREIGN PATENT DOCUMENTS

| | | |
|---|---|---|
| DE | 102005012623 A1 | 9/2006 |
| DE | 102008040673 A1 | 1/2010 |

*Primary Examiner* — Sang K Kim
(74) *Attorney, Agent, or Firm* — Dickinson Wright PLLC (57) ABSTRACT A belt retractor (40) having a belt reel (14), a seat belt (12) which can be wound thereon to form a belt reel, and at least one first assembly, the first assembly being arranged coaxially with the axis of rotation of the belt reel (14) and in series with the belt reel (14). The belt retractor is especially adapted for mounting inside the frame member of a motor vehicle seat.

15 Claims, 4 Drawing Sheets (56) References Cited

U.S. PATENT DOCUMENTS

| | | |
|---|---|---|
| 7,021,582 B2 | 4/2006 | Tanaka et al. |
| 8,141,447 B2 | 3/2012 | Beutler et al. |
| 8,469,301 B2 | 6/2013 | Maemura et al. |
| 8,398,012 B2 | 9/2013 | Lucht et al. |
| 8,944,206 B2 | 2/2015 | Odate |
| 10,870,410 B2 * | 12/2020 | Jabusch .............. B60N 2/688 |
| 2002/0130545 A1 | 9/2002 | Tanji |
| 2002/0140278 A1 | 10/2002 | Hlavaty et al. |
| 2004/0021029 A1 | 2/2004 | Eberle et al. |
| 2005/0173580 A1 | 8/2005 | Lucht et al. |
| 2005/0264059 A1 | 12/2005 | Clement et al. |
| 2005/0284977 A1 | 12/2005 | Specht et al. |
| 2007/0085397 A1 | 4/2007 | Tanaka |
| 2007/0194565 A1 | 8/2007 | Clute |
| 2008/0246316 A1 | 10/2008 | Carine et al. |
| 2009/0146487 A1 | 6/2009 | Becker et al. |
| 2009/0243273 A1 | 10/2009 | Viernekes |
| 2010/0001503 A1 | 1/2010 | Tanaka et al. |
| 2010/0176649 A1 | 7/2010 | Kohama |
| 2010/0187885 A1 | 7/2010 | Yamada |
| 2010/0206111 A1 | 8/2010 | Keller et al. |
| 2010/0244542 A1 | 9/2010 | Sealy et al. |
| 2011/0147509 A1 | 6/2011 | Wang et al. |
| 2012/0248846 A1 | 10/2012 | Titz et al. |
| 2013/0193252 A1 | 8/2013 | Lucht et al. |
| 2013/0256445 A1 | 10/2013 | Lucht et al. |
| 2014/0103696 A1 | 4/2014 | Odate |
| 2015/0158590 A1 | 6/2015 | Gehret et al. |
| 2016/0082922 A1 | 3/2016 | Yoon |
| 2017/0050612 A1 | 2/2017 | Ford |

* cited by examiner

MODULAR SEATBELT RETRACTOR

CROSS-REFERENCE TO RELATED APPLICATIONS

This application is a continuation of U.S. patent application Ser. No. 16/173,166, filed Oct. 29, 2018, which claims the benefit of priority under 35 U.S.C. § 119 to German Patent Application No. 10 2018 213 282.8, filed Aug. 8, 2018, the contents of which are incorporated herein by reference in their entirety.

FIELD OF THE INVENTION

The present invention concerns a seat belt retractor for a motor vehicle.

BACKGROUND

The basic components of seat belt retractors are a load-bearing frame and a rotatable belt reel mounted in the frame, on which a seat belt can be wound up.

In addition to supporting the belt reel, the frame is also used to attach the retractor to a seat structure or a vehicle structure and is typically made of a correspondingly thick steel sheet which is bent into a U-shaped frame.

Vehicle seats with seat belt devices are, for example, known for use as front seats in cabriolet style vehicles in which at least the belt retractors of the seat belt devices are fastened to the backrests of the vehicle seats. In this case, the belt retractors are preferably integrated into the backrests of the vehicle seats for lack of a load-bearing B-pillar and reasons of access to the rear seats or for reasons of distance to the rear vehicle structure, which must also be designed to absorb the tensile forces applied to the seatbelt webbing in the case of restraint. The belt retractors themselves have all the basic components of a standard belt retractor and are only fitted with various additional components specially designed for installation in the backrest, such as a self-aligning inertia sensor.

In its basic structure, the vehicle seat has a seat structure consisting of several load-bearing structural parts which serve to fasten the vehicle seat to the vehicle structure. The seat structure is equipped with springs and upholstery to improve seating comfort and also serves to attach other components such as various seat adjustment mechanisms, including the associated electric motors and other components such as heating devices, sensors, displays, headrests and the likes.

In modern vehicles with autonomous driving systems, there is an increasing demand for greater adjustability of the vehicle seats in different orientations and positions, so that the vehicle occupant can use the freedoms gained by autonomous driving, e.g. for deeper communication with the other occupants, for extended and more intensive rest periods or work and can align the vehicle seat accordingly. As a result, the seat belt device and in particular the belt retractor no longer has to be attached to the vehicle structure as before, but instead to the vehicle seat, as was the case with the front seats of convertibles, for example.

One problem however, is that the belt retractor with its other components requires a comparatively large amount of installation space due to its external dimensions so that installation in the vehicle seat can be problematic. This is due in particular to the fact that the seat belt must have a certain minimum thickness for the tractive forces to be absorbed at a specified width of e.g. 46 mm and a certain minimum length of e.g. 2,500 mm for the restraint of the occupant so that the belt reel on the reel of a fully wound seat belt has a correspondingly large outer diameter due to the volume of the seat belt to be wound up. This large belt reel is further enlarged towards the outside by a correspondingly large frame of the belt retractor and other components such as a drive device for an irreversible belt tensioner, an electric motor for a reversible belt tensioner, a force limiting device, sensor devices or the like, which further increases the installation space required.

Against this background, the invention is based on the task of providing a belt retractor which can also be arranged in a limited installation space of a vehicle seat.

To solve the problem, a belt retractor with the features as described herein is proposed.

SUMMARY AND INTRODUCTORY DESCRIPTION OF THE INVENTION

According to an embodiment of the invention, a belt retractor is described with a belt reel, a seat belt which can be wound onto it to form a belt reel (or spindle)_and at least one first assembly in which the other assembly is arranged coaxially and in series with the belt reel. With the proposed solution, the belt retractor can be arranged in a space-saving design in a narrow, elongated space on the vehicle seat. The assembly is deliberately arranged in coaxial alignment in series with the belt reel so that an elongated geometry of the belt retractor can be achieved. Since the further assembly is arranged in series with the belt reel, i.e. in relation to the longitudinal direction of the axis of rotation of the belt reel, behind or in front of the belt reel, the assembly can be arranged so that it protrudes only slightly, if at all, beyond the belt reel to the outside. Since vehicle seats generally have cavities, but these are often oblong and narrow, the proposed solution allows the belt retractor to be much better adapted to and arranged in these existing installation spaces. The assembly can include for example, a reversible belt tensioner, an irreversible belt tensioner, a force limiting device, a sensor device or a control device. If further assemblies are planned, these assemblies are preferably arranged in series with respect to the axis of rotation of the belt reel, i.e. one behind the other, whereby the elongated design of the belt retractor is continued and further extended.

It is further proposed that the other assembly, perpendicular to the axis of rotation of the reel, has external dimensions smaller than or identical to the maximum external diameter of the reel when the seatbelt is fully wound on the reel. Since the belt reel has a circular cross-section and, in the design embodiments described is arranged in each case in a cavity with a quadrangular cross-section, the cavities for receiving the belt retractor have a quadrangular cross-section with side lengths corresponding at least to the diameter of the maximum belt reel. This results in approximately triangular, elongated free spaces in the corners, which can of course also be used. In the sense of the present invention, such a protrusion into these free spaces should also be understood as within the external dimensions specified by the maximum diameter of the belt reel.

The completely wound up belt reel thus determines the maximum outer dimensions of the belt retractor with a maximum outer diameter, which cannot be reduced for the reasons mentioned above. This allows the belt retractor to be as narrow as possible so that it can also be arranged in elongated narrow installation spaces of the vehicle seat or other vehicle structures. If the belt retractor is mounted in a cavity of a load-bearing structural part of the vehicle or vehicle seat, it may also replace the previously required frame of the belt retractor by holding and supporting the belt reel of the belt retractor directly on the load-bearing structural part. Furthermore, in this case, the tensile forces acting on the seatbelt webbing in the case of restraint can be introduced directly into the structural part, whereby the load-bearing structural part can be specifically designed to absorb the restraining forces by shaping the cavity. If the load-bearing structural part is a structural part of the seat structure, it is already designed to absorb seat forces and other forces acting on the vehicle seat and thus would typically have sufficient strength to be used by the proposed solution to absorb the restraining forces exerted by the seat belt. Furthermore, the load-bearing structural part has a particularly high torsional and bending stiffness due to the intended hollow space and the resulting three-dimensional design, which in turn is advantageous for load absorption and restraint of the occupant in an accident.

It is also proposed that the belt retractor is mounted in one or more webs between an assembly and the reel or between two assemblies. In addition to supporting the belt retractor, the web can also be used to accommodate other functional units such as sensors, gas generators, control units or the like. The web can also be used to reinforce the load-bearing structural part. In particular, the web allows the belt retractor to have an elongated shape with assemblies arranged in series.

It is also suggested that at least one-second web be provided, spaced from the first web. The second web allows the belt retractor's bearing arrangement to be further improved and further assemblies and functional units, e.g. for the further assemblies of the belt, retractor can be provided.

It is also proposed that a second assembly is provided which is coaxial and arranged in series with the belt reel and the first assembly. The second assembly allows the belt retractor to be provided with further functions, whereby the belt reel and the first assembly are taken over unchanged at least in their basic structure. The belt retractor can therefore have a modular design, which can be equipped with various functions according to customer and application requirements thanks to its modular design.

The second web can preferably be arranged between the first assembly and the second assembly so that it serves as a bearing location for two assemblies simultaneously.

It is further suggested that the first or second assembly is a pyrotechnic belt tensioner including a tensioner drive tube having a pyrotechnically drivable drive provided therein and a drive wheel transmitting the drive movement of the drive to the belt reel, the tensioner drive tube having a linear section and a curved section disposed at the end of the linear section, and the tensioner drive tube being disposed such that the linear section is parallel to the axis of rotation of the belt reel and with the curved section tangentially circumferentially directed toward the drive wheel. The advantage of the proposed design of the pyrotechnic belt tensioner is that it can be made particularly compact with the proposed design and arrangement of the tensioner drive tube, whereby the tensioner drive tube can preferably be arranged in a linear clearance at the edge of the belt retractor through the linear section and the parallel arrangement to the axis of rotation, whereby the outer dimensions of the belt retractor are increased only slightly, if at all.

It is also proposed that a force limiting device forms the first or second assembly with a first torsion bar coaxial with the belt reel. The proposed solution allows the belt retractor to be realized in the narrowest possible compact design with a particularly simple design.

If the force limiting device is to be realized with a step-shaped force limitation curve, it may have at least one-second torsion bar arranged in series with the first torsion bar. With the second torsion bar, the force limitation level can be achieved with different force limiting levels depending on the dimensioning of the two torsion bars, whereby the coaxial arrangement, in turn allows a compact, slim structure of the belt retractor to be achieved.

It is also proposed that a tubular extension, coaxial with the axis of rotation of the belt reel and into which the first and/or second torsion bar projects, be provided at one end of the belt reel. The extension extends the belt reel axially and creates a bearing shoulder for a blocking part which can be blocked by a blocking device and to which the first and/or second torsion bar is connected or can be connected via a coupling. The torsion bar is in turn connected either directly to the belt reel or via the extension to the latter in a rotationally fixed manner so that when the blocking part is blocked and a defined belt pull-out force is exceeded, it begins to deform plastically about its own longitudinal axis and thus destroy the energy.

It is also proposed that the belt retractor with the tubular extension be mounted on the first and/or second web. This is particularly advantageous during plastic deformation of the torsion bar(s), as the forces to be absorbed can be absorbed as close as possible to their point of origin by the bearing, and the resulting torques in the bearing can be kept low.

It is further proposed that the first or second or third assembly is formed by a reversible belt tensioner with an electric motor, the electric motor with its extended drive shaft being coaxial with the axis of rotation of the belt reel.

BRIEF DESCRIPTION OF THE DRAWINGS

The invention is explained in the following with reference to the enclosed figures and the preferred forms of execution.

DETAILED DESCRIPTION

Figure 1A:
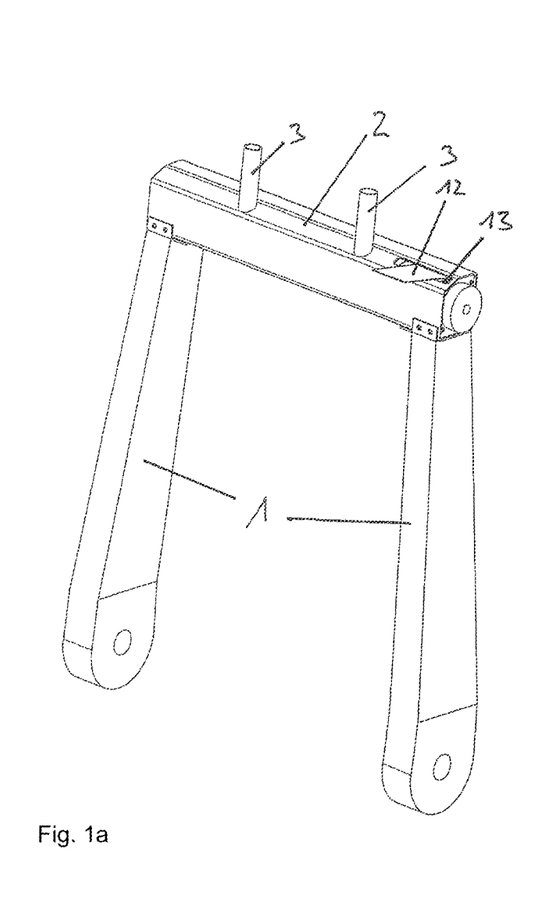
FIGS. 1a and b show two longitudinal struts of a vehicle seat with a load-bearing structural part and a belt retractor arranged therein in accordance with the invention.
Figure 1B:
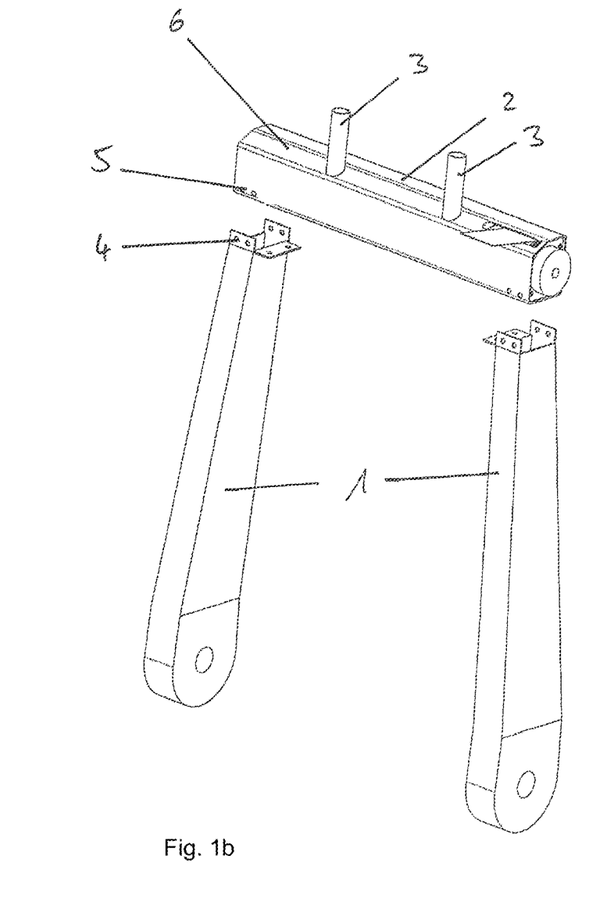

FIGS. 1a and b show a part of a seat structure of a vehicle seat for a motor vehicle which forms the backrest of the vehicle's seat. The seat structure forms the dimensionally stable "core" of the vehicle seat and is additionally equipped with springs and/or upholstery to improve seating comfort. In addition, other functional components not shown on the seat structure, such as seat adjustment mechanisms, a headrest, electronic devices such as displays, or even heating devices, are provided.

The seat structure formed of a composite of several load-bearing structural parts 2, two of which are formed by parallel longitudinal struts 1. The upper ends of the longitudinal struts 1 are connected by a load-bearing structural part 2 to form a dimensionally stable upper side of the backrest. For the connection of the longitudinal struts 1, there are fixing holes 4 on these upright brackets, and fixing holes are also provided on structural part 2, through which the parts are connected either by screws or rivets.

Figure 2:
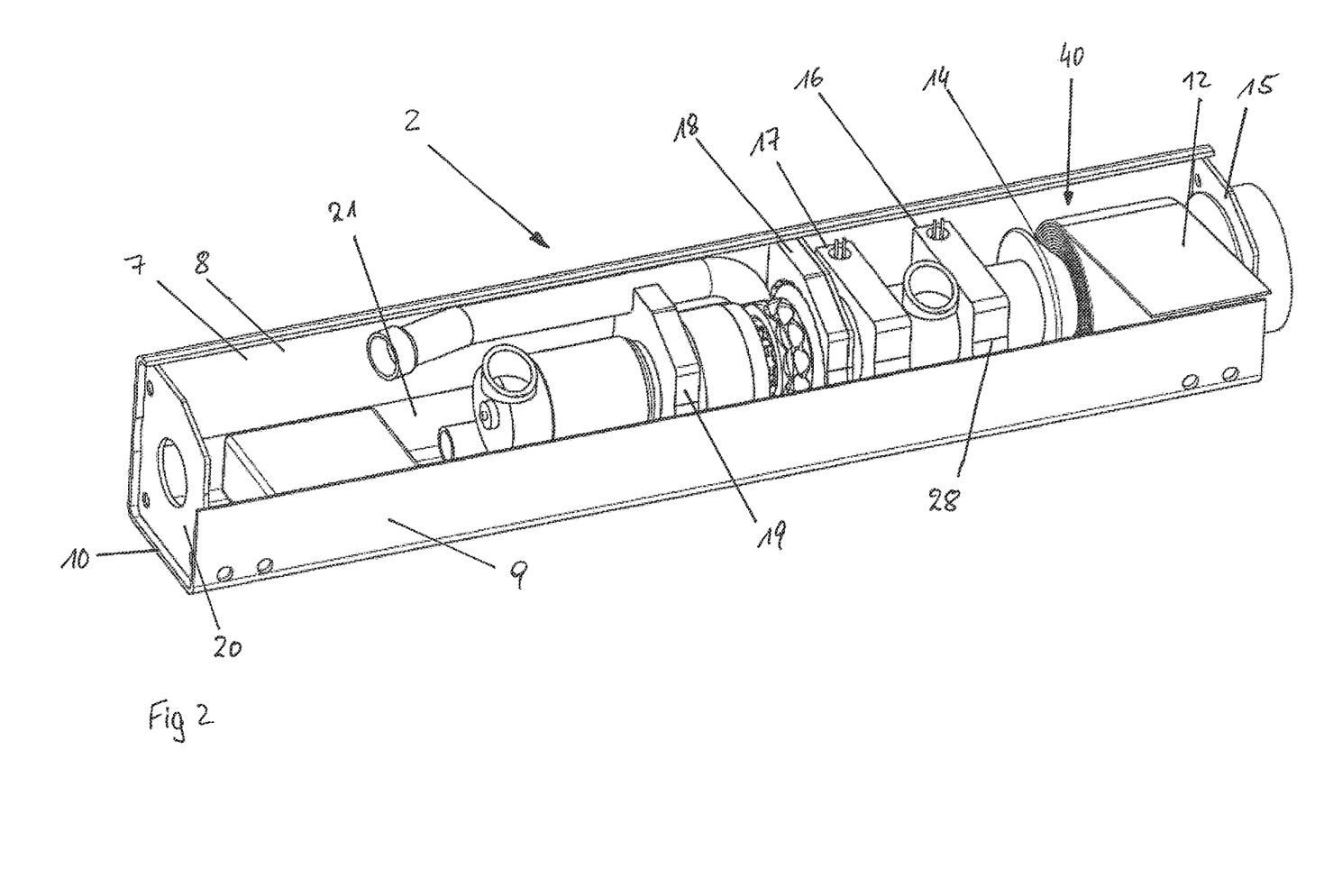
FIG. 2 shows the load-bearing structural part having a cavity and the inventive belt retractor located therein as a single part.

In FIG. 2, the load-bearing structural part 2 can be seen in an enlarged representation as a single part. The load-bearing structural part 2 includes as a basic component a housing in the form of a U-shaped profile rail 7 with a base surface 10 and two opposite, parallel, well-shaped legs 8 and 9 which stand up from the base surface 10. The profile rail 7 has an opening 28 formed between the edge sides of the legs 8 and 9, which is closed by an insert 6 to be seen in FIG. 1, but which was omitted in FIG. 2 for better recognition of the structural part 2. The insert 6 is formed by a plate with a shape adapted to the shape of the opening 28 and has a slot 13 through which a seat belt 12, described in more detail below, is guided from a cavity 21 between the legs 8 and 9 to the outside towards a restrained occupant on the vehicle seat. The insert 6 closes or reduces the opening 28 to the provided slot 13 so that the cavity 21 is closed to the outside, and a belt retractor 40 provided in it is protected against mechanical influences. The ends of the profile rail 7 are each closed by a web 15 and 20.

Figure 3:
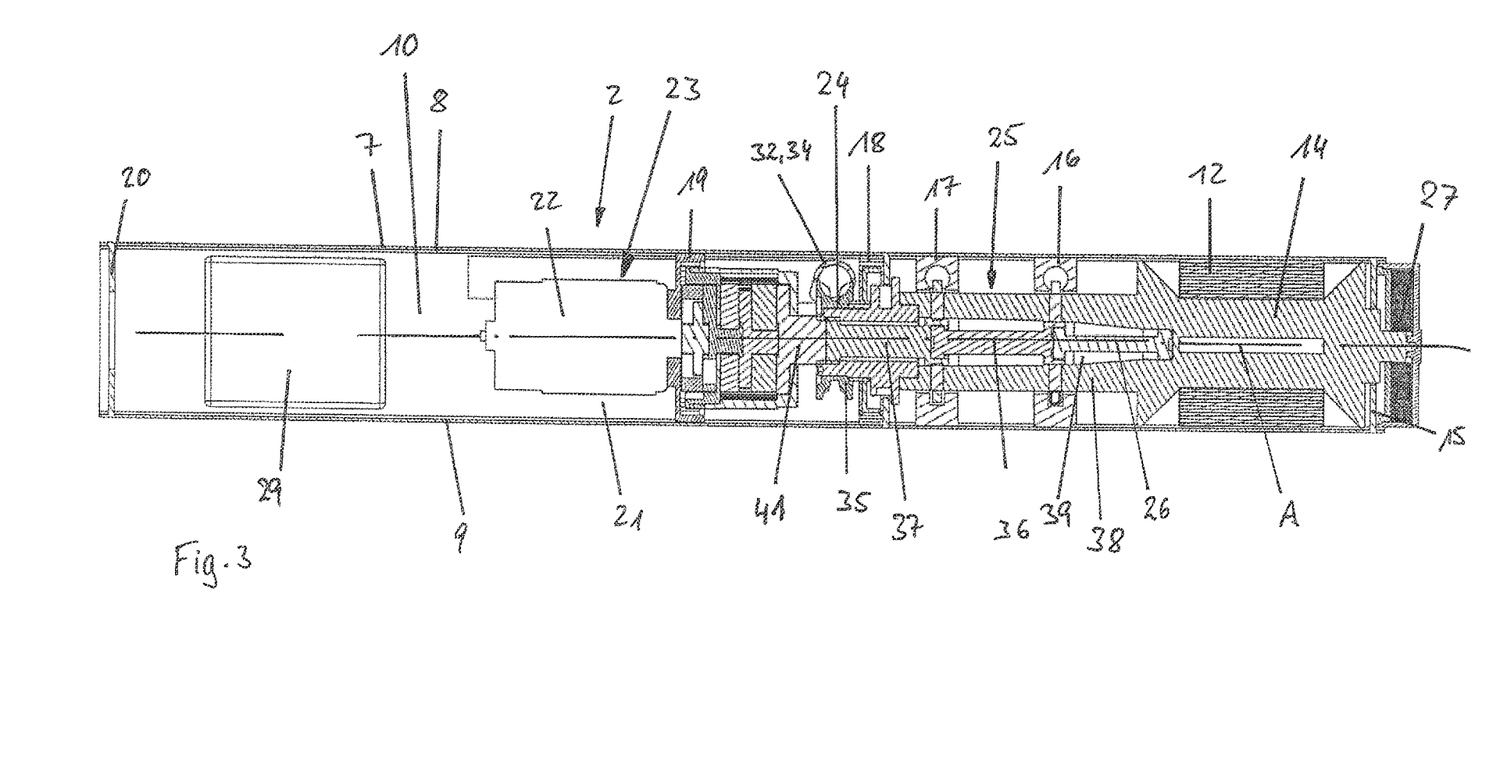
FIG. 3 is a sectional view of the load-bearing structural part with the cavity and the invention belt retractor arranged therein.

In the cavity 21 of the load-bearing structural part 2, the belt retractor 40 is arranged with a belt reel (or spindle) 14 and the seat belt 12 that can be wound on it, which can be seen in sectional view in FIG. 3. In addition to the belt reel 14, the belt retractor 40 has a further assembly or also the first assembly in the form of a force limiting device 25 with several torsion bars 26, 36 and 37, a second assembly in the form of a pyrotechnic irreversible belt tensioner 24 and a third assembly in the form of a reversible electromotive belt tensioner 23 in a coaxial arrangement with the axis of rotation of the belt reel 14. In addition, the assemblies are arranged in series, one behind the other, with the belt spool 14. The outer dimensions of the belt reel 14 with the maximum length of seat belt 12 wound on it, as well as the outer dimensions of the force limiting device 25, the pyrotechnic belt tensioner 24 and the electromotive belt tensioner 23 are selected in the cross-sectional area perpendicular to the axis of rotation of the belt reel 14 in such a way that they are not larger than the outer dimensions of the belt reel on the belt reel 14 with the maximum length of seat belt 12 wound on it or otherwise fit within the dimensions of cavity 24. Furthermore, the external dimensions are not larger than the dimensions of the cavity 21 perpendicular to the longitudinal extension of the profile rail 7, so that the belt retractor 40 with the assemblies can be arranged in the cavity 21 of the profile rail 7.

In the profile rail 7, several webs 15,16,17,18,19 and 20 are provided in the form of wall sections aligned perpendicularly to the longitudinal extension of the profile rail 7, which extend from one of the legs 8 or 9 to the respective other leg 8 or 9 of the profile rail 7 and are connected to them. Furthermore, the webs 15, 16, 17, 18, 19 and 20 can extend up to the base surface 10 of the profile rail 7 and thus fill the entire cross-sectional area of the profile rail 7. The webs 15, 16, 17, 18, 19 and 20 each have one or more openings or projections in which the belt retractor 40 or parts thereof such as the belt reel 14 are stored, fastened and/or passed through. In addition, one of the webs 15, 16, 17, 18, 19 and 20, for example, may also have a toothing or other blocking configuration in which the reel 14 or other parts of the retractor can be blocked. In addition, the webs 15, 16, 17, 18, 19 and 20 may also have additional cavities to accommodate other components of the belt retractor such as pyrotechnic gas sources for the pyrotechnic belt tensioner 24, electronic components such as sensors, electronic control units or storage units. If the webs 15, 16, 17, 18, 19 and 20 extend from one of the legs 8 or 9 to the other leg 8 or 9, the webs 15, 16, 17, 18, 19 and 20 can also be used to stiffen the profile rail 7, which in turn is advantageous for the load-bearing capacity and dimensional stability of the profile rail 7 in the case of restraint loads exerted by the occupant.

The components of the belt retractor 40 are deliberately arranged coaxially and one behind the other, so that the assemblies do not increase the outer dimensions of the belt retractor radially outwards, and the belt retractor 40 can also be arranged in a narrow, elongated cavity 21 of the profile rail 7. This allows the profile rail 7 and the load-bearing structural part to be correspondingly narrow and elongated which is particularly advantageous when using the load-bearing structural part in a seat structure of the vehicle seat. Webs 15, 16, 17, 18, 19 and 20 may be affixed to profile rail 7 in a manner to restrain torsional forces imparted by the first, second or third assemblies. Accordingly, the structure of belt retractor does not bear all such loads, which are instead, distributed along rail 7.

FIG. 3 shows the load-bearing structural part in section through the profile rail 7 and the belt retractor. The profile rail 7, which is U-shaped in cross-section, has the legs 8 and 9 facing the observer in this illustration and a base surface 10. Between the legs 8 and 9, there is a cavity 21 in which the belt retractor 40 is arranged. The cavity 21 is divided in accordance with this embodiment_by six webs 15, 16, 17, 18, 19 and 20 in the longitudinal direction of the profile rail 7, whereby the two outer webs 15 and 20 close the cavity 21 to the outside at the two ends of the profile rail 7. A spring cassette with a driving spring 27 is held on the right web 15, which in turn is connected to the belt reel 14 and thereby pretensions the belt reel 14 in the winding direction of the seat belt 12 wounds on it. The belt reel 14 is provided at its end projecting into the profile rail 7 with force limiting device 25, which is formed by a tubular extension 38 of the belt reel 14 arranged coaxially to the belt reel 14, three torsion bar 26, 36 and 37 arranged in series and a blocking part 41 which can be locked against rotation relative to the profile rail 7. In the present design, three torsion bar 26, 36 and 37 are provided, which are each connected or connectable with one end to the belt reel 14 or to the tubular extension 38 in a rotationally fixed manner and with the other end in each case by a switching device provided in a web 16 or 17 in a rotationally fixed manner relative to the profile rail 7 blockable or detachable from the latter. The torsion bar 26, 36 and 37 can thus be activated individually or in combination, whereby the restraining forces can be realized at different force limitation levels or a step-shaped force limitation process.

The locking part 41 may be lockable in the pull-out direction of the seat belt 12 by a locking device which can be controlled in a vehicle-sensitive and/or webbing sensitively manner, whereby the force limiting device 25 is locked, so that it is subsequently automatically activated when the force limiting level defined by the force limiting device 25 itself is exceeded. In addition, a pyrotechnic, irreversible belt tensioner 24 with a drive wheel 35 arranged coaxially to the belt reel 14 is provided, which drives the belt reel 14 in the winding direction when activated via an intermediate clutch and tightens the seat belt 12. In addition, a reversible belt tensioner 23 with an electric motor 22 is provided which, when activated via a second or even the same coupling as the pyrotechnic belt tensioner 24, drives the belt reel 14 in the winding direction and thereby tightens the seat belt 12. The electric motor 22 is also arranged coaxially to the belt reel 14 and thus also to the force limiting device 25 and to the pyrotechnical belt tensioner 24. Furthermore, an electronic control unit 29 is provided in the profile rail 7 of the load-bearing structural part 2, which can be used to control the belt retractor 40 and/or other components.

Load-bearing structural part 2 is a basic component of the seat structure by connecting other parts of the seat structure, such as the longitudinal struts 1 shown in FIG. 1. The structural part 2 has thus the task to form the seat structure and serves by the provided cavity 21 additionally for the admission of the belt retractor 40 according to the invention. The load-bearing structural part 2 can be pre-assembled as an assembly with the belt retractor 40 and then be finally assembled with the manufacturing of the seat structure and/or the vehicle seat as an assembly unit.

The profile rail 7 forms the basic component of the load-bearing structural part 2 and is shaped and dimensioned according to the connection of the other structural parts to be realized in the seat structure. The profile rail 7 can replace the previously required frame of the belt retractor 40 by serving both to support the belt retractor 40 and to fasten the belt retractor 40 to the vehicle seat and to block the belt reel 14.

The belt retractor 40 is modular with the belt reel 14 and the other assemblies, namely the force limiting device 25, the pyrotechnical belt tensioner 24 and the reversible belt tensioner 23 in a coaxial row arrangement. The assemblies are deliberately designed in such a way that their radial outer dimensions do not exceed the dimensions of the belt reel on the belt reel 14 with the maximum number of wraps of seat belts wound, for example, up to 12, as can be seen in FIG. 3.

The webs 15, 16, 17, 18, 19 and 20 can be understood as functional walls in addition to their storage and structural function, or alternatively by providing corresponding receptacles and an arrangement of different functional units in or on the receptacles. To enable them to fulfill their bearing function, the webs 15, 16, 17, 18, 19 and 20 are preferably supported between the legs 8 and 9 and the base surface 10 of the profile rail 7 or between the housing parts 30 and 31 shown in FIG. 4a in a rotationally fixed manner.

Figures 4A, 4B:
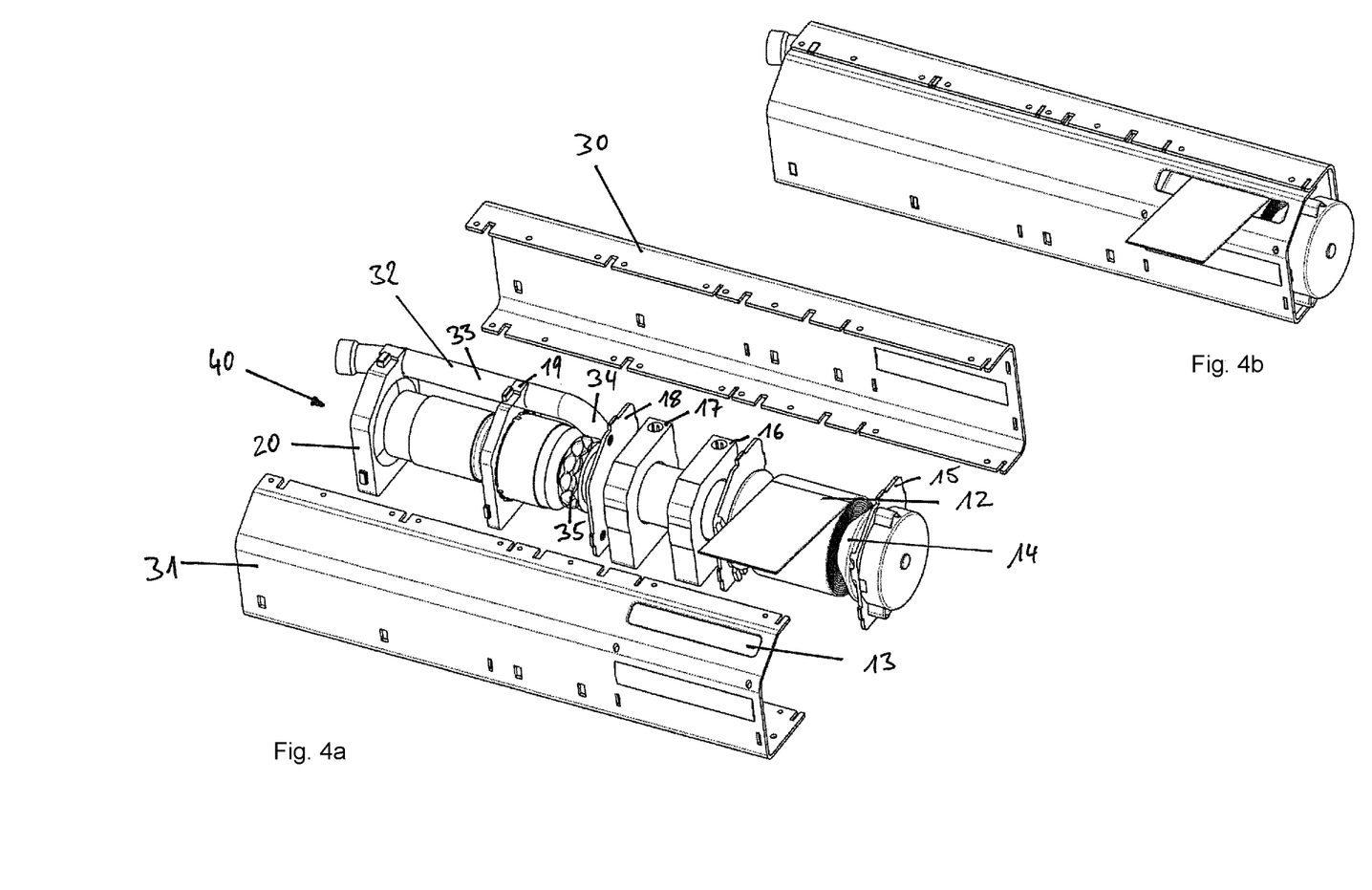
FIGS. 4a and 4b show a belt retractor according to the invention with a two-part housing.

FIGS. 4a and 4b show an alternative design example in which the belt retractor 40 is equipped with a two-part housing with two housing parts 30 and 31 instead of a one piece housing in the form of profile rail 7. The housing parts 30 and 31 are each U-shaped and enclose the belt reel 14 and the other assemblies including the webs 15, 16, 17, 18, 19 and 20 in the assembled position on the outside, as shown in the upper right illustration of FIG. 4b. In the assembled position, the housing parts 30 and 31 form an elongated cavity 21 with a square cross-section. Since the belt reel 14 with the seat belt 12 wound thereon and the other assemblies are of circular cross-section, an elongate free space of approximately triangular cross-section is provided in the corners between the belt reel of the belt reel 14, the assemblies and the housing, which free space is used here for the arrangement of the tensioner drive tube 32. The tensioner drive tube 32 is used to guide a drive device, such as a chain of loose-mass bodies, or an elastic drivetrain, which is accelerated when the pyrotechnic belt tensioner is activated and thus brought into drive connection with the drive wheel 35. The drive wheel 35 and the belt reel 14 are then driven to rotate in the winding direction of the seat belt 12. The tensioner drive tube 32 has a linear section 33 and a curved section 34 and is aligned and arranged to be aligned with the linear section 33 parallel to the axis of rotation of the belt reel 14 and the drive wheel 35 and to be tangentially circumferentially directed with the curved section 34 toward the outer periphery of the drive wheel 35. The curved section 34 is curved exclusively in one plane so that the curved section 34 and the linear section 33 are arranged in one plane, wherein the tensioner drive tube 32 is aligned so that the plane spanned by the linear section 33 and the curved section 34 is parallel to the axis of rotation of the belt reel 14.

The housing parts 30 and 31 in the assembled position with the belt retractor 40 arranged in the form of a dimensionally stable part which can be used as the load-bearing structural part 2 in the seat structure as seen in FIG. 1. Moreover, the various webs 15, 16, 17, 18, 19 and 20 can be structurally coupled to one or both of housing parts 30 and 31 to react against torsion forces imposed by the first, second or third assemblies.

The load-bearing structural part 2 with the housing in the form of profile rail 7 or the housing parts 30 and 31 was described in a horizontal installation geometry as shown in FIG. 1, which has advantages with regard to an horizontal alignment of the seat belt 12 in the feed to the occupants. A horizontal alignment of the seat belt 12 in the feed to the occupants is advantageous in that the seat belt 12 can be guided horizontally onto the shoulder of the occupants without being deflected again.

Alternatively, the load-bearing structural part 2 can also be arranged on the seat structure in a vertical or inclined orientation. The seat belt 12 is then fed in an inclined direction or deflected to the occupant in the intended direction by a separate deflecting device. In addition, structural part 2 may also be located at a lower point or on one side of the seat structure of the backrest instead of at an upper edge of the backrest if the seat structure or the supply of the seat belt so requires and/or allows. Instead of the profile rail 7 or the housing parts 30 and 31, it would also be conceivable to provide a tubular structural part 2 with a circular or different cross-section in which the belt retractor 40 is arranged and in particular, pushed in at the end face.

While the above description constitutes the preferred embodiment of the present invention, it will be appreciated that the invention is susceptible to modification, variation and change without departing from the proper scope and fair meaning of the accompanying claims.

The invention claimed is:

1. A seatbelt retractor comprising,
a belt reel,
a seatbelt which can be wound up into the belt reel,
a first assembly; and
the first assembly is disposed coaxially with an axis of rotation of the belt reel and in series with the belt reel, and
the seatbelt retractor is contained and mounted within a load-bearing structural part of a motor vehicle or a motor vehicle seat structure, and wherein the structural part forming an elongated interior cavity with the belt reel and the first assembly contained within the interior cavity, and
a second assembly is provided with is coaxial and arranged in series with the belt reel and the first assembly, the second assembly contained within the interior cavity,
the second assembly is a pyrotechnic belt tensioner having a tensioner drive tube with a pyrotechnically drivable drive device provided therein, and the drive device drives a drive movement of the belt reel which is transmitted by a drive wheel, wherein the tensioner drive tube has a linear section and a curved section disposed at an end of the linear section, and the tensioner drive tube is arranged such that the linear section runs parallel to the axis of rotation of the belt reel and is directed with the curved section tangentially in a circumferential direction toward the drive wheel and, the tensioner drive tube is contained within the interior cavity.

2. The seatbelt retractor according to claim 1, further comprising the tensioner drive tube is arranged such that the linear section and the curved section are arranged in a plane parallel to the axis of rotation of the belt reel.

3. A seatbelt retractor comprising, a belt reel, a seatbelt which can be wound up into the belt reel, a first assembly; and the first assembly is disposed coaxially with an axis of rotation of the belt reel and in series with the belt reel, and the seatbelt retractor is contained and mounted within a load-bearing structural part of a motor vehicle or a motor vehicle seat structure, and wherein the structural part forming an elongated interior cavity with the belt reel and the first assembly contained within the interior cavity, and a second assembly is provided which is coaxial and arranged in series with the belt reel and the first assembly, the second assembly contained within the interior cavity, a third assembly is formed by a reversible belt tensioner having an electric motor, and the third assembly is contained within the interior cavity wherein the electric motor is arranged with a drive shaft guided coaxially with the axis of rotation of the belt reel.

4. A seatbelt retractor comprising, a belt reel, a seatbelt which can be wound up into the belt reel, a first assembly; and the first assembly is disposed coaxially with an axis of rotation of the belt reel and in series with the belt reel, and the seatbelt retractor is contained and mounted within a load-bearing structural part of a motor vehicle or a motor vehicle seat structure, and wherein the load-bearing structural part forming an elongated interior cavity with the belt reel and the first assembly contained within the interior cavity, wherein the structural part forms an upper generally horizontal member connecting with and positioned between a pair of vertical struts of the seat structure.

5. A seatbelt retractor comprising, a belt reel, a seatbelt which can be wound up into the belt reel, a first assembly; and the first assembly is disposed coaxially with an axis of rotation of the belt reel and in series with the belt reel, and the seatbelt retractor is contained and mounted within a load-bearing structural part of a motor vehicle or a motor vehicle seat structure, and wherein the structural part forming an elongated interior cavity with the belt reel and the first assembly contained within the interior cavity, the structural part is formed with a base surface and two opposite legs, the base surface and the legs forming the interior cavity.

6. The seatbelt retractor according to claim 5, further comprising the first assembly has a smaller or an identical outer dimension in a direction perpendicular to the axis of rotation of the belt reel than a maximum outer diameter of the belt reel when the seatbelt is fully wound on the belt reel.

7. The seatbelt retractor according to claim 5, further comprising the seatbelt retractor is mounted on a first web arranged between the belt reel and the first assembly, the first web supported by the structural part and spanning within the interior cavity.

8. The seatbelt retractor according to claim 5, further comprising, the seatbelt retractor is mounted on a first web arranged between the belt reel and the first assembly, the first web supported by the structural part and spanning within the interior cavity, and a second web is provided for mounting the seatbelt retractor, and the second web is spaced apart from the first web in an axial direction of the belt retractor, the second web supported by the structural part and spanning within the interior cavity.

9. The seatbelt retractor according to claim 8, further comprising in that the second web is arranged between the first assembly and a second assembly which is coaxial and arranged in series with the belt reel and with the first assembly.

10. The seatbelt retractor according to claim 9, further comprising the first web and the second web are coupled to the structural part for reacting to torsional forces acting on the first or the second assembly.

11. The seatbelt retractor according to claim 5, further comprising a second assembly is provided which is coaxial and arranged in series with the belt reel and with the first assembly, the second assembly contained within the interior cavity.

12. The seatbelt retractor according to claim 5, further comprising the first assembly is formed by a force limiting device having a first torsion bar disposed coaxially with the belt reel.

13. The seatbelt retractor according to claim 12, wherein the force limiting device further comprises a second torsion bar arranged in series with the first torsion bar.

14. The seatbelt retractor according to claim 12, further comprising a tubular extension arranged coaxially with the axis of rotation of the belt reel and into which the first torsion bar projects, and provided on an end face of the belt reel.

15. The seatbelt retractor according to claim 14, further comprising the belt retractor with the tubular extension is mounted on a first web spanning across the interior cavity.

\* \* \* \* \*